July 4, 1939.  C. E. RUTHERFORD  2,164,788
PANCAKE TELEPHONE OUTLET
Filed July 17, 1937
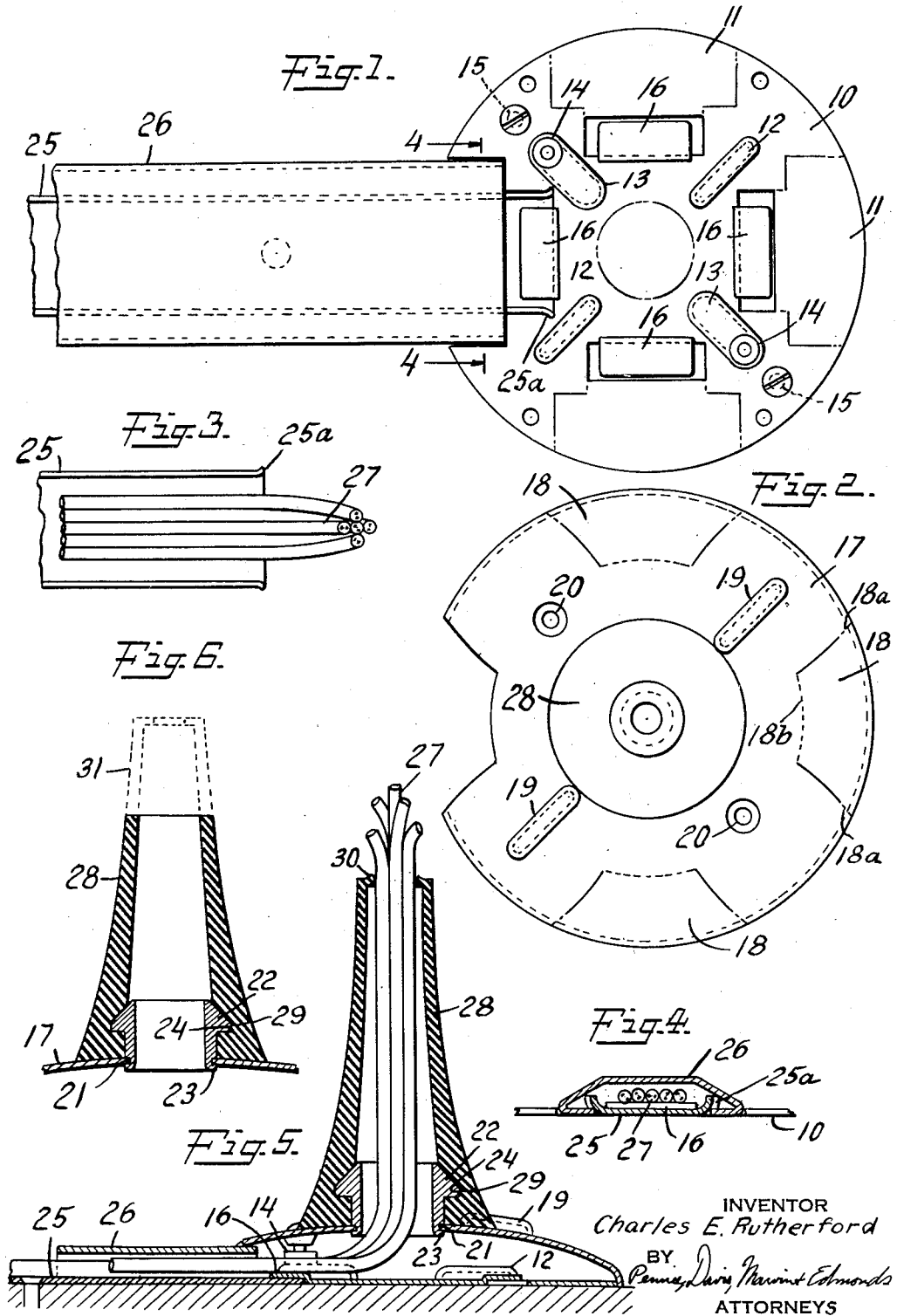
INVENTOR
Charles E. Rutherford
BY
ATTORNEYS Patented July 4, 1939

2,164,788

UNITED STATES PATENT OFFICE 2,164,788

PANCAKE TELEPHONE OUTLET

Charles E. Rutherford, West Hartford, Conn., assignor to The Wiremold Company, Hartford, Conn., a corporation of Connecticut Application July 17, 1937, Serial No. 154,308

1 Claim. (Cl. 220—3.8)

In my pending patent application, Serial No. 154,307, filed July 17, 1937, I have disclosed certain new electrical outlets particularly adapted for use in connection with the type of conduit known as overfloor raceway, such for example as is shown in my Patent No. 2,027,619. My present invention consists in an outlet designed particularly for telephone wires, though useful for other types of wires, similarly adapted for use in connection with an overfloor raceway.

In the drawing attached to this specification

Figure 1 is a plan view of the base member of my outlet attached to the overfloor raceway;

Figure 2 is a plan view of the cover;

Figure 3 is a plan view with the cover of the conduit removed of a portion of the structure shown in Figure 1, showing the wires in place;

Figure 4 is a section on the line 4—4 of Figures 1 and 3;

Figure 5 is a section in elevation of my device completely assembled and ready for use, and Figure 6 is a section showing the sleeve member cut off to accommodate the exit of an unusually large number of wires.

In Figure 1, 10 is the base, which is made of stamped metal and supplied with knockouts 11, 11, with reinforced flanges 12 and with additional punched flange members 13, 13, each of which carries a metal ring 14 threaded internally to allow the insertion of screws for fastening the cover in place. The base member is also provided with screw holes 15, 15, by which it may be fastened to the floor or other portion of the building, and with tongues 16, 16.

The cover member 17, shown in Figure 2, is provided with knockouts 18, 18, with reinforcing flanges 19, 19, and with screw holes 20, 20, which when the cover is in place register with the threaded openings in the rings 14, 14, referred to above.

In forming the knockouts 18 care is taken not to cut through the metal, but merely to score it, at the points 18a, 18a; that is to say, at or adjacent to the circumference of the base, so as not to interfere with the strength of the circumference of the base. In this manner the danger that the outlet would be actually crushed if accidentally stepped upon is greatly reduced. It is also generally inadvisable to cut through, but merely to score, at the points 18b. I have indicated in solid lines the points where I cut through the metal and in dotted lines the points where the metal is merely scored. This feature is claimed in my co-pending application above mentioned.

In the center of the cover there is a circular opening 21 which, as shown more fully in Figure 5, is provided with an annular metal member 22 held in place on the cover by being peened over the edge, as shown at 23. This member is provided with a flange 24, the purpose of which will be explained hereafter.

The conduit or overfloor raceway in the form shown in my Patent 2,027,619, mentioned above, consists of two members, a base member 25 and a cover member 26. In order to install the receptacle in place in connection with such a conduit it is necessary to punch out one of the knockouts, 11, 11, in the base and one of the knockouts 18, 18, in the cover, whereupon the outlet may be assembled in place on the conduit as shown in Figure 5. The wires 27 (Figures 3 and 5) are led through the conduit and up through the sleeve member 28, described below. At the point where the wires leave the conduit it is best to bend over the ends of the vertical members of the base member 25 of the conduit, as shown at 25a in Figure 3, so as to avoid the presence of sharp edges which might cut the insulation on the wires.

28, Figures 5 and 6, is a sleeve member of soft, resilient material, such as rubber, provided near its base on the inside with an annular recess 29 adapted to engage with the flange 24 on the member 22, so that the sleeve will project vertically from the cover of the outlet as shown in Figure 5. It will be noted that the internal diameter of the sleeve member gradually decreases as the distance from the flange 24 increases and that near the small end, which is the upper end, of the sleeve member I provide an internal fin 30.

In assembling the device the sleeve member 28 is forced over the member 22 by mechanical pressure, whereupon it snaps into place and maintains a rigid engagement which is permanent, waterproof and dustproof. The fin 30 makes it possible to use any reasonable number of wires and at the same time it prevents the entrance of dust. If in special cases the number of wires is greater than can be accommodated by the flexing of the fin 30 it is only necessary to cut off the upper portion of the sleeve member as shown at 31 in Figure 6 at such height as to afford an opening to accommodate the number of wires which are to be used on that particular occasion.

The use of my outlet in combination with the overfloor raceway as shown makes it possible to provide an outlet for telephone wires which can be located at any desired point on a floor without the danger of accident, since the raceway is so shaped as to make it practically impossible to stumble over it and the sleeve member 28 is of flexible material so that it will not cause injury as the result of accidental contact with, for example, the foot when one is walking across the floor. The sleeve 28 is held in place on the cover without the use of any special clamping member. The device is waterproof and dustproof, as well as being simple, cheap to manufacture and easy to install.

I claim:

In an electrical outlet fitting adapted for engagement with the end of a conduit for electrical conductors, the improvement comprising a cover member having an opening to allow the exit of electrical conductors, an annular member secured at one end in the last-mentioned opening said annular member having an exterior fin adjacent the other end, the surface of said fin adjacent the said cover member being substantially perpendicular to the longitudinal axis of said annular member, a tapered sleeve member of resilient material relatively thick at its larger end, the inner surface of said sleeve member adjacent its larger end being provided with an annular groove shaped to embrace the exterior fin on said annular member, whereby said sleeve is firmly attached to said cover member by elastic engagement with the said annular member.

CHARLES E. RUTHERFORD.